United States Patent [19]

Olson

[11] Patent Number: 5,154,794
[45] Date of Patent: Oct. 13, 1992

[54] TIRE ENVELOPE EXPANDER

[76] Inventor: John C. Olson, 3315 S. Vandecar Rd., Mt. Pleasant, Mich. 48858

[21] Appl. No.: 633,763

[22] Filed: Dec. 26, 1990

[51] Int. Cl.$^5$ .................................. B29D 30/54
[52] U.S. Cl. .................. 156/394.1; 156/96; 156/909; 425/14; 425/17
[58] Field of Search .......... 156/909, 96, 394.1, 156/406.2, 406.6, 421.8, 494, 126; 264/36; 425/14, 17, 48

[56] References Cited

U.S. PATENT DOCUMENTS

| | | | |
|---|---|---|---|
| 2,442,499 | 6/1948 | Kraft | 18/18 |
| 3,809,592 | 5/1974 | Dennis | 156/394 |
| 3,847,695 | 11/1974 | Gross | 156/96 |
| 3,925,128 | 12/1975 | Edler | 156/96 |
| 4,036,677 | 7/1977 | Marangoni | 156/394 |
| 4,123,306 | 10/1978 | Landry | 156/96 |
| 4,310,374 | 1/1982 | MacMillan | 156/394 |
| 4,382,834 | 5/1983 | Satzler | 156/382 |
| 4,437,920 | 3/1984 | Kubo | 156/406.2 |
| 4,902,380 | 2/1990 | Olson | 156/909 |

FOREIGN PATENT DOCUMENTS 2092100 1/1982 United Kingdom.

OTHER PUBLICATIONS

Oliver Rubber Company brochure for "Labor Saver" (undated).
Olson's Firestone Service brochure entitled "Saves you Time and Money" (undated).

*Primary Examiner*—Geoffrey L. Knable
*Attorney, Agent, or Firm*—Basile and Hanlon

[57] ABSTRACT

An envelope expander for mounting an annular envelope of a flexible resilient material upon a tire supported upon a tire support with the tire axis in a horizontal position includes a vertically disposed rigid gate-like frame having a central opening of a diameter exceeding that of a tire. A plurality of expander members adapted to grip the envelope at spaced locations along the edge of a circular opening in one side of the envelope are mounted on the frame for coordinated power driven movement radially of the frame opening between radially inner and outer end limits. With the expander members at their radially inner end limits, the envelope opening is slightly stretched and manually mounted on the members. The expanding members are then driven to their radially outer end limits, expanding the envelope opening to a diameter greater than that of the tire. Relative movement between the frame and tire support is then utilized to move the tire through the expanded envelope opening into the interior of the envelope. The expander members are then returned to their radially inner end limits and disengaged from the envelope.

9 Claims, 3 Drawing Sheets

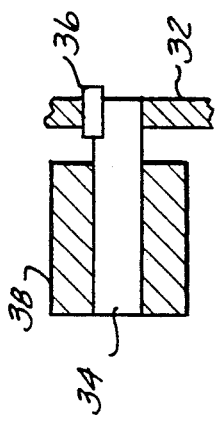
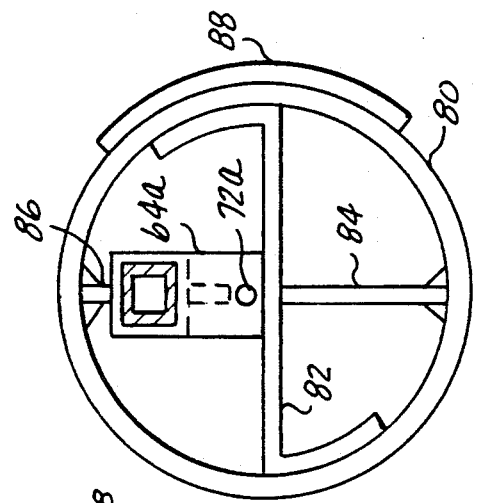
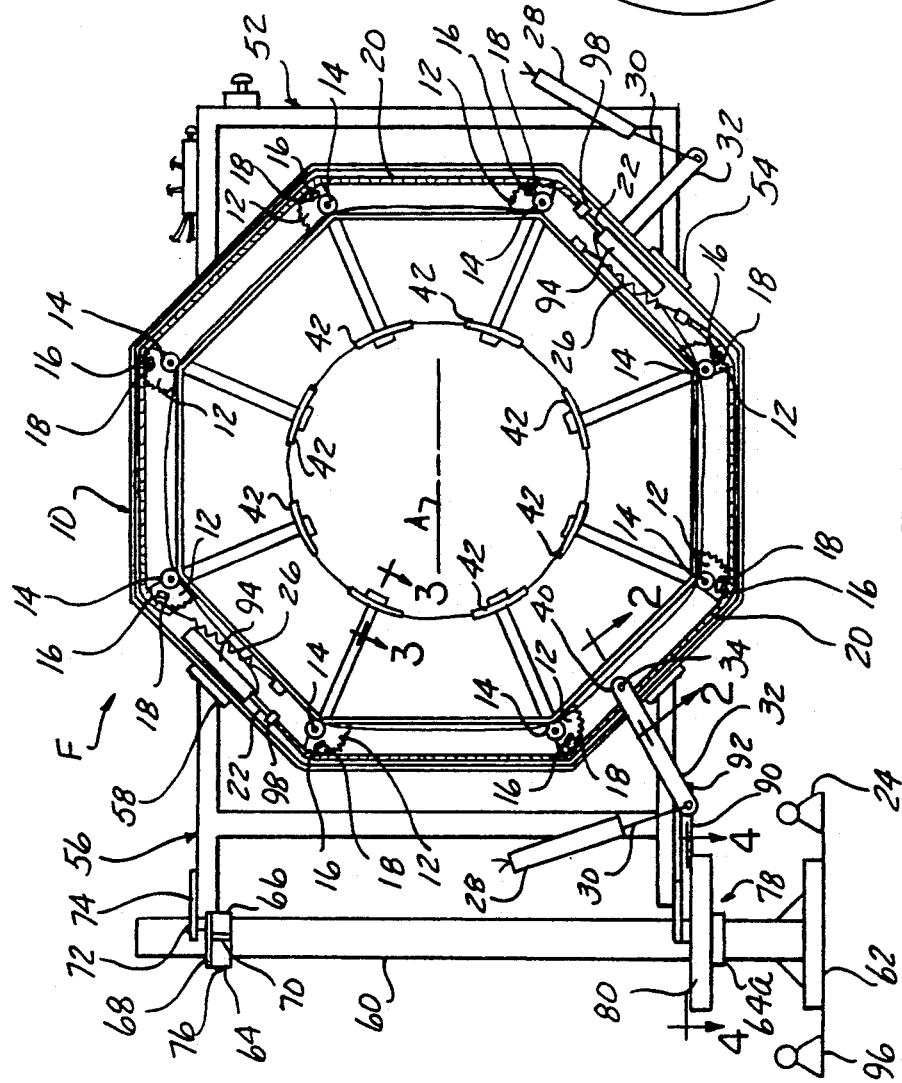

TIRE ENVELOPE EXPANDER

BACKGROUND OF THE INVENTION

I. Field of the Invention

The present invention relates to an apparatus for expanding and mounting or demounting an annular envelope of a flexible resilient material upon a tire.

II. Description of the Prior Art

In a tire retreading operation, a layer of bonding compound is applied to the buffed tire carcass and the new tread is then applied to the carcass. The tire is then inserted into an annular envelope of flexible rubber or synthetic sheet material which encloses the outer side walls and tread of the tire. The envelope is then sealed to the opposite outer sides of the tire along the tire beads and evacuated so that atmospheric pressure will firmly press the tread against the tire compound while bonding takes place. See U.S. Pat. No. 4,624,732 to King, which discloses an apparatus for sealing such an envelope to the tire and presents a somewhat more detailed description of the function of the envelope.

The envelope in question is of a general configuration similar to that of a tire, except that it is formed of a relatively thin, flexible rubber sheet. Like the tire, the annular envelope has circular openings through its opposite sides whose diameter is approximately equal to the inner diameter of the tire on which it is to be mounted. When mounted upon the tire, the envelope is sealed to the outer side of the tire beads around these openings in the envelope. The remainder of the envelope will loosely encase the tire.

Because the tire must be inserted into the envelope through one of the circular openings in the envelope, and the diameter of that opening is substantially less than the outer diameter of the tire, the envelope opening must be expanded or stretched to accommodate the insertion or removal of the tire into or out of the envelope. While this is frequently done manually, manual mounting and demounting of the envelope is a difficult, time consuming and frequently painful task. Tires most likely to be retreaded are those subjected to heavy duty usage, such as truck tires, for example, and these larger sized tires are more difficult to manually insert or remove from the envelope.

While various machines for mounting and demounting such envelopes on tires have been on the market, they have had but limited appeal to the retreading industry. High cost and operational problems seem to be the major drawbacks.

One such machine presently being marketed includes a hoist from which the tire is suspended in a horizontal (tire axis vertical) position. Below the hoist is a table-like housing having a circular array of articulated fingers mounted upon the top of the housing. After a tire has been manually mounted upon the hoist, the hoist is elevated clear of the fingers which are then located in a radially innermost position. The envelope is then placed on top of the housing. The edges of the uppermost central opening of the envelope are manually engaged with the fingers which are then power retracted radially outwardly to stretch the engaged envelope opening. The hoist is then operated to lower the tire downwardly through the expanded opening into the interior of the envelope. The fingers are then extended radially inwardly, and manually disengaged from the envelope. The enveloped tire may then be removed from the holder. Removal of the envelope is accomplished by reversing the foregoing procedure.

A disadvantage of these previously known tire envelope expanders is the floor space required to accommodate the size of the device.

A further disadvantage of these expander devices is the horizontal orientation of the tire and the envelope. The device forces an operator to lean over the machine in order to mount the envelope onto the envelope applicator.

The present invention is directed to apparatus for mounting and demounting envelopes upon tires which can be produced at a cost substantially less than the machine described above and which performs the mounting and demounting operation in a more efficient manner.

SUMMARY OF THE INVENTION

In accordance with the present invention, an envelope mounter-demounter is constructed with a gate-like rigid frame which lies in a general vertical plane. The frame is formed with a central opening extending horizontally through the frame, the central opening having a diameter greater than the maximum outer diameter of a tire to be presented to the apparatus.

A plurality of sprockets are mounted upon the frame about the periphery of the opening. The sprockets are interconnected by a chain, driven by hydraulic pumps. Rotation of the sprockets drives expanding members radially inwardly and outwardly toward and away from the central axis of the opening in the frame.

The expanding members are arcuately curved lengths of hollow tubing which are positioned within the frame to approximately conform to segments of a circle centered on the axis of the opening. The sprockets typically are semi-circular, rotating about a central pivot pin. The expanding members typically are fixedly mounted upon the pivot pins of the respective sprockets. The sprocket and driving mechanism is contained completely within the frame, thereby eliminating any potential clearance problems.

A semi-circular slot within each sprocket is guided by a pin fixedly attached to the frame. This slot and pin arrangement limits the rotation of the sprocket about the central pivot pin. This arrangement retains the respective expanding member in its desired relationship to the others.

The tubular expanding members may be positioned by their respective sprockets at a radially inner end limit of movement at which the curved expanding members roughly approximate a circle having a diameter which is but slightly greater than the relaxed diameter of one of the circular openings in the resilient envelope. With the expanding members in this position, the peripheral edge of the envelope opening can be mounted manually upon the expanding members with only a slight stretching of the envelope. Once so mounted, the pump is actuated creating pressure in the hydraulic pump and operating the piston rod connected to the chain. The chain is spring biased, pulling the members radially outwardly to expand the circular opening in the envelope to a diameter large enough to freely receive a tire.

In the present invention, no manual handling of the tire is required. The tire, upon which the envelope is to be mounted, is supported during the envelope mounting operation by some component of the retreading processing apparatus. Typically, the tire in one arrangement will be supported in a vertical (axis horizontal)

position upon an arbor which may be used in the tread applying step. In this case, the rigid frame which carries the expander members is mounted for pivotal movement about a vertical axis for a gate-like swinging movement in a path such that the tire supported upon the arbor will pass through the opening in the rigid frame.

In another arrangement, tires are suspended from an overhead monorail conveyor in a vertical position by a hook-like support and the rigid frame, which carries the expanding members, is mounted at a location extending across the path of movement of the tires along the monorail. The frame is so located that the tires will be conveyed through the central opening in the frame, and the frame is provided with an opening in the portion of the frame above the central opening which will accommodate passage of a conveyor suspension hook upon which the tire is supported.

Other objects and features of the invention will become apparent by reference to the following specification and the drawings.

BRIEF DESCRIPTION OF THE DRAWINGS

FIG. 1 is a front view of one form of envelope expander embodying the present invention;

FIG. 2 is a detailed cross sectional view taken on the line 2—2 of FIG. 1;

FIG. 4 is a detailed cross sectional view taken on the line 4—4 of FIG. 1;

DESCRIPTION OF THE PREFERRED EMBODIMENTS

Figure 3:
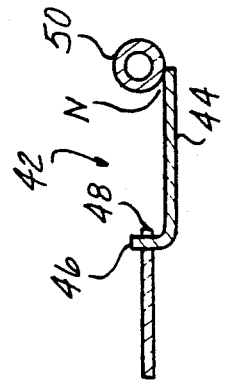
FIG. 3 is a detailed cross sectional view taken on the line 3—3 of FIG. 1.

Referring first to FIGS. 1 and 2, an envelope expander embodying the present invention includes a rigid gate-like frame, designated generally F, which is vertically disposed to lie in a vertical general plane. As best seen in FIG. 1, a portion 10 of frame F is of an open octagonal configuration which is symmetrical about a central, horizontal axis A. The size of the central opening through octagonal frame 10 is such as to define an opening of a diameter which is larger than the outer diameter of tires upon which the envelope expander is to operate.

A plurality of sprockets 12 are mounted at spaced locations around the periphery of octagonal frame 10. The sprockets 12 are typically semi-circular and rotate about a central pivot pin 14. A slot 16 is located inward of the sprocket's outer circumference. A pin 18 is fixedly attached to the frame 10 for sliding rotation of the slot 16 about the pin 18. This slot 16 and pin 18 arrangement defines the rotational limits of the sprocket 12.

A chain 20 engages the sprockets 12 for rotation about their respective pivot pins 14. One end of the chain 20 is attached to a piston rod 22 connected to a pump 24. The chain 20 is spring biased, as shown by the spring 26 attached to the opposite end of the chain 20 and fixedly attached to the frame 10.

Where insufficient floor clearance is present, or components of tire builders or stands are in the way, hydraulic cylinders, such as 28, may be mounted at locations on frame F, such as those shown in FIG. 1, and have their piston rods 30 coupled to a link 32 pivotally mounted on the frame. Thus, the links 32 could be incorporated where needed to provide clearance space. Pin 34 is rotatably connected to link 32 as by a key 36. Pin 34 is rotatably received within a bushing 38 mounted in a frame 10. Essentially, the links 32 are fixedly coupled to the frame 10 via the pivot pin 34 and key 36, to function as a lever in which the distal ends 40 of the links 32 will move generally radially of axis A upon reciprocation of the piston rods 30 of hydraulic cylinders 28.

Expanding members 42 of like construction are fixedly mounted upon the central pivot pin 14 of each sprocket 12. Each expanding member includes a mounting member 44 in the form of a flat plate bent upwardly at one end as at 46 to form a flange which is bolted to the end of expanding member 42 as by a bolt 48 as best shown in FIG. 3. At the opposite end of mounting member 44, a length of hollow metal tubing 50 is fixedly secured, as by welding, to mounting member 44 in a generally T-shaped relationship to the mounting member. The tube member 50, as best seen in FIG. 1, is bent so that its longitudinal axis follows an arcuate curve having a constant radius of curvature.

Referring now particularly to FIG. 1, frame F also includes an auxiliary frame portion, designated generally 52, which is fixedly mounted upon the octagonal frame 10 as by bolts 54. Frame 52 serves as a mounting location for one of the hydraulic cylinders 28.

As best seen in FIG. 1, a second auxiliary frame portion, designated generally 56, is fixedly mounted upon octagonal frame 10 at the opposite side of the frame, again as by bolts 58. Frame portion 56 is employed to mount the gate-like frame F for pivotal movement about a vertical axis relative to a fixed mounting post 60.

Mounting post 60 is fixedly mounted upon a base 62 which will be fixedly secured in position on the shop floor. Post 60 is formed from a length of square steel tubing. Upper 64 and lower 64a adjustable pivot brackets are received upon post 60 to be located at selected positions of vertical adjustment on the post. The upper bracket 64 takes the form of a square hollow tubular sleeve 66 which is slidably and adjustably received upon post 60. A mounting platform 68 is fixedly secured, as by welding, to one side of the sleeve 66 and projects horizontally outwardly from the sleeve and may be supported as by a triangular gusset 70. A vertical bore through platform 68 receives a vertically disposed pivot pin 72 which rotatably receives and supports a mounting strap 74 fixedly welded to frame 56.

Sleeve 66 may be fixedly clamped at a selected position of vertical adjustment on post 60 as by one or more clamping bolts 76 threaded through the wall of the sleeve and engaged with the side of post 60.

The lower mounting bracket 64a is of a construction similar to the upper bracket 64, described above, but functions not only to support frame 56, but to also serve as a mounting for a portion of a brake assembly, designated generally 78.

Referring now particularly to FIGS. 1 and 4, a circular metal band 80 is fixedly mounted upon the lower pivot bracket 64a as by suitably located rigid webs, such as 82, 84 and 86 (FIG. 4), welded to bracket 64a and the inner side of band 80 to fixedly mount band 80 on bracket 64a with the axis of band 80 coaxial with the axis of pivot pin 72a on bracket 64a. The outer surface of band 80 is engaged by an arcuate brake pad 88 fixedly mounted on the end of piston rod 90 of a hydraulic cylinder 92 (FIG. 1) fixedly mounted on frame 56.

Pump 96 supplies pressure to the head end of cylinder 92, while the rod end is vented, thereby applying the brake pad 88 against the fixed circular brake band 80. Upon manual actuation of the pump 96, the connections to cylinder 92 are reversed to retract the piston rod 90, thereby releasing the brake.

Referring now particularly to FIG. 1, a pump 24 circulates oil for operating, in this instance, two hydraulic cylinders 94. The cylinder 94 receives therein a double acting piston rod 22 which is reciprocated in a conventional manner as oil or other fluid is introduced into and removed from the rod and head ends of the piston (not shown).

The piston rod 22 is connected by a pivot pin 98 to a chain 20. The chain 20 is engaged by the sprockets 12 spaced equidistant about central axis A. The opposite end of the chain 20 is fixedly attached to a spring 26 which is in turn fixedly attached to the frame 10.

As the piston rod 22 is extended from a retracted position, the chain 20 is pulled by and towards the spring 26. This pulling rotates the sprockets 12 clockwise about pivot pins 14. The expanding members 42, fixedly attached to the pivot pins 14, also rotate or pivot clockwise into a closed position. The tube members 50, having an arcuate curve of constant radius, form the circumference of a circle.

As the piston rod 22 is retracted from an extended position, the chain 20 is pulled toward the cylinder 94. The chain 20 rotates the sprockets 12 counter-clockwise, pivoting the expanding members 42 into a full open position.

The movement of the expanding members 42 between the two positions just described is limited by a slot 16 and pin 18, the slot 16 being integrally formed with each respective sprocket 12 and the pin 18 being fixedly attached to the frame 10.

Figure 5:
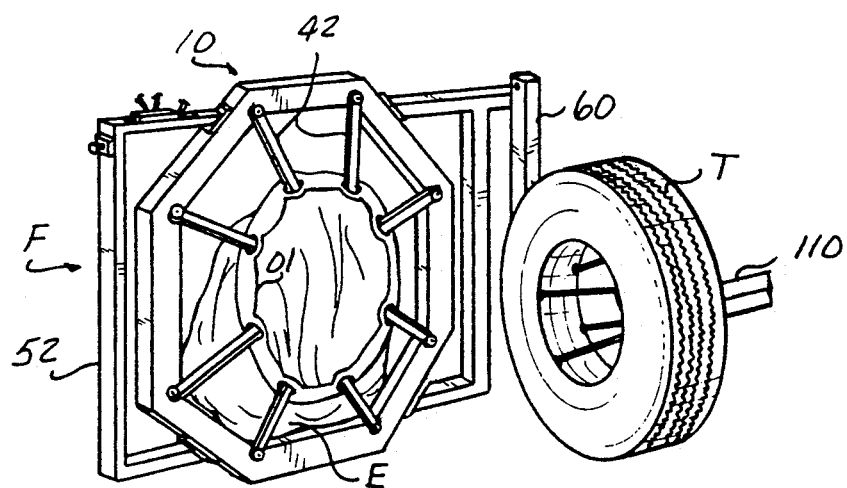
FIGS. 5, 6 and 7 are perspective views, with certain parts omitted or broken away, showing successive steps of the operation of the expander of FIG. 1.
Figure 6:
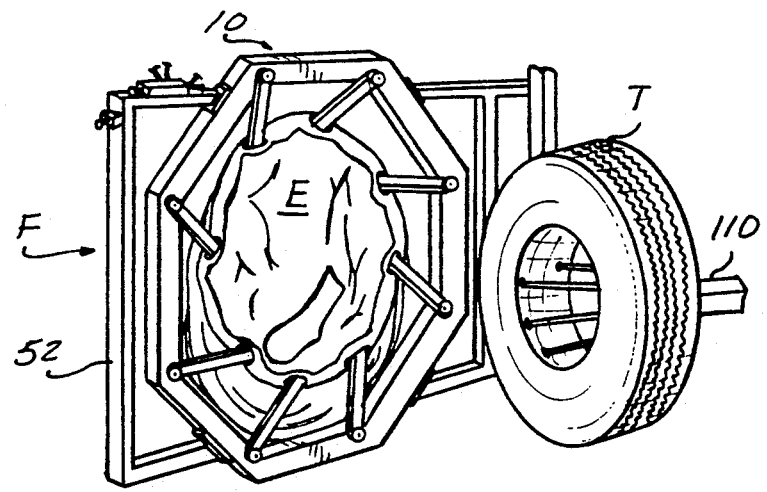
Figure 7:
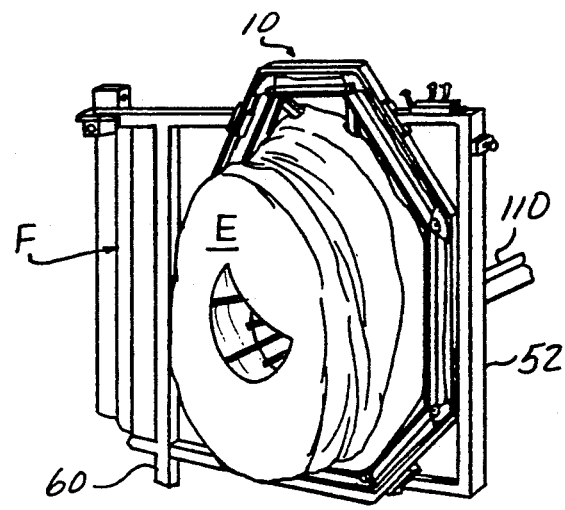

Operation of the apparatus described above is best seen in FIGS. 5–7.

Post 60 is mounted in the shop floor at a location relative to a tire supporting arbor, designated generally 110, such that a tire T supported on the arbor with its axis horizontal is located within the path of pivotal movement of the central opening in octagonal frame 10 of the expander. At the commencement of an envelope mounting operation, frame F is pivoted to a position, such as that shown in FIG. 5, in which the frame is well clear of the tire T. Frame F will be held in this position by the actuated brake assembly 78. The first step of the envelope mounting operation is to manually actuate cylinders 94 to fully extend their piston rods to locate the various expander members in the radially innermost end limit of movement shown in FIG. 1.

With the expander members at their radially inner end limit of movement, the operator manually grasps the envelope E and places the peripheral edge of one opening 01 of the envelope manually over all of the tubular expander members 42. This will require at least a slight stretching of the peripheral edge of the opening, and when the opening has been passed around all of the tubular members, the peripheral edge of the opening will be held in tension within the notch N (FIG. 3) defined by the circumference of the various tubular members 50 and the flat surface of the mounting member 44 which is in tangential relationship with the outer circumference of the tubular member.

With the periphery of opening 01 so engaged with the expander members, the operator then actuates pump 24 to cause cylinders 94 to retract their piston rods, thereby drawing all of the expanding members 42 radially outwardly. This expands opening 01 of the envelope, see FIG. 6. The resistance to this radial expansion of the opening diameter is evidenced in the resilient envelope primarily as a tension along the periphery of opening 01, and this tension acts to more firmly seat the edge of the opening on the respective expansion members.

When the piston rods of cylinder 94 have been fully retracted, opening 01 has now been expanded to a diameter larger than the outer diameter of the tire T.

The operator then grasps auxiliary frame 52 and manually activates pump 96 to release the brake. The operator manually pivots frame F to swing the frame from the position shown in FIG. 6 to that shown in FIG. 7. During this movement, the tire T on arbor 110 is passed through the expanded opening 01 in the envelope and through the opening in frame 10 so that when the frame F arrives in the position shown in FIG. 7, the tire is located within the interior of envelope E.

The operator then activates pump 96 to reapply the brake and again actuates cylinders 94 to extend their piston rods, thereby returning the expanding members to their radially inner end limit of movement. The operator may now easily disengage the periphery of opening 01 of the envelope from the expanding members, retract the expanding members clear of the tire, and return the frame to the original position of FIG. 5. Demounting of an envelope from a tire is accomplished by reversing the foregoing process.

The embodiment described above is adapted for use when the tire upon which the envelope is mounted is supported upon a stationary arbor such as 110. In some retreading operations, a conveying system, such as a monorail conveyor, may be employed to transport tires from the tread application station to a curing oven which accelerates the bonding of the tread to the carcass. With minor modifications, shown in FIG. 8, the envelope expander may be easily adapted to mount, or demount, envelopes to or from tires T which may, for example, be suspended from a monorail conveyor 200 as by a J-shaped carrier 202. In this case, the frame F is interrupted or formed with an opening in the octagonal frame 10a which will enable conveyance of the tire into or out of an expanded envelope on the expander by movement of the conveying means, rather than by the expander frame. In the case of a monorail conveyor, such a clearance opening through the frame is formed at the top of the frame as at 206.

Figure 8:
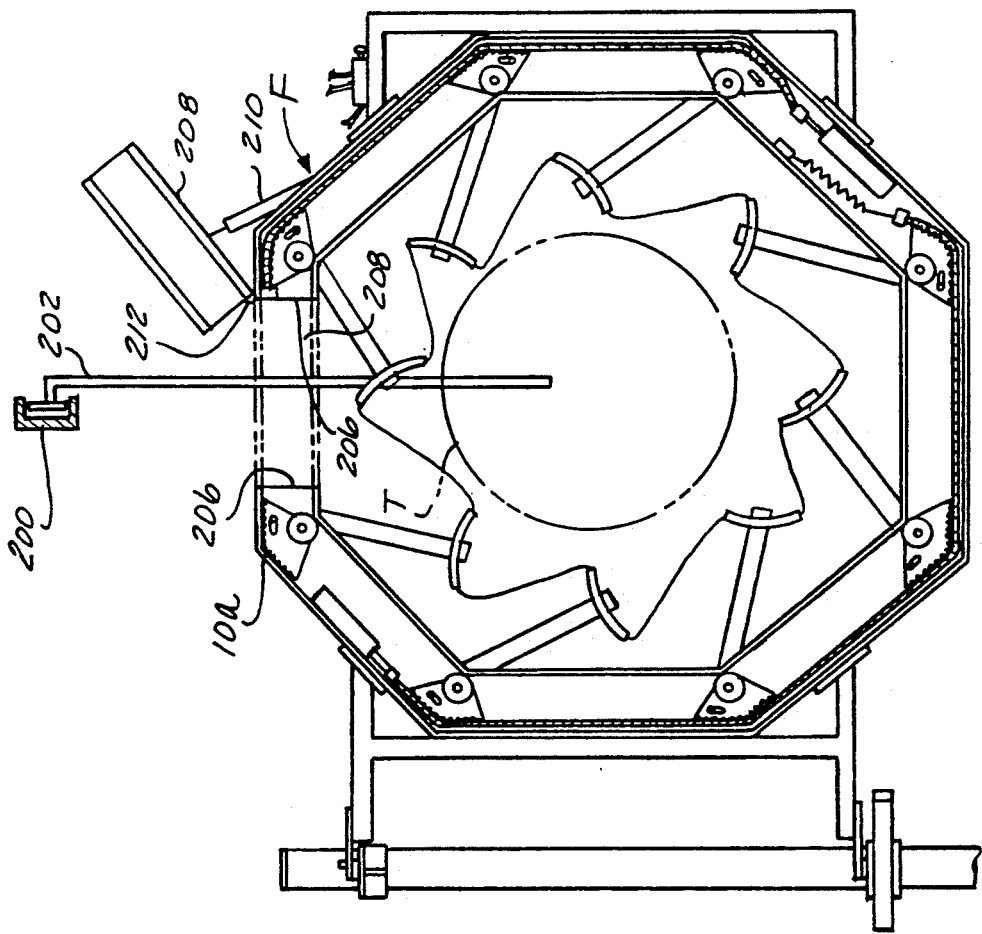
FIG. 8 is a front view, with certain parts broken away, omitted or shown in cross section of a modified embodiment of the invention.

When using the invention with a conveyor system, the opening 206 provided at the top of frame F must be reinforced during mounting of the envelope E. Once the tire T enters the expanded envelope E, an interlocking frame 208 is activated pneumatically 210, or by other well known means, about a hinge 212 to close the octagonal frame 10a (shown in phantom). This strengthens the frame F during operation. Once the expansion is performed, the interlocking frame 208 is returned to its open position, allowing the tire T to continue along the conveyor.

Where the expander is employed with a conveying system, as in FIG. 8, the frame 10a may be pivotally mounted upon a post as in the previous embodiment, so that the frame may be swung clear of the path of movement of the conveyor and tires suspended on the conveyor. Alternatively, the frame may be mounted in a fixed position on the shop floor at a selected location along the conveying path.

Operation of the expander to mount and demount the envelope will be according to the procedure previously described. Where the expander frame is mounted at a fixed location, i.e., not mounted for pivotal movement, the brake and brake actuator of the embodiment of FIG. 1 is not required.

While various embodiments of the invention have been described in detail, it will be apparent to those skilled in the art, the disclosed embodiments may be modified. Therefore, the foregoing description is to be considered exemplary rather than limiting and the true scope of the invention is that defined in the following claims.

What is claimed is:

1. An envelope expander for mounting an annular envelope of a flexible resilient material on a tire, said envelope having a pair of axially aligned central apertures at opposite sides of said envelope of a diameter approximately equal to the inner diameter of a tire, and said envelope being adapted to enclose the outer surfaces of said tire, said envelope expander comprising:
    a tire support for supporting a tire with a tire axis in a horizontal position:
    a rigid gate-like frame lying in a general vertical plane, pivotable about a generally vertical axis and having an unobstructed opening therethrough generally symmetrical about a central horizontal axis normal to said general plane and of a size sufficient to accommodate the free passage of said tire therethrough with the axis of the tire generally coaxial to said central axis:
    at least one fluid pressure actuated cylinder mounted on said rigid frame having a reciprocal piston rod projecting from said cylinder for coordinated movement between first and second end limits of movement;
    a plurality of envelope engaging members pivotally connected to said rigid frame at respective locations spaced around the periphery of said central axis;
    means for rotating said envelope engaging members about axes parallel to said central axis, said rotating means operatively connected to said rigid frame and said cylinders for coordinated movement between first and second end limits of movement, wherein said rotating means comprises:
        a plurality of sprockets fixedly mounted to said envelope engaging members and pivotally mounted to said rigid frame; and
        means for engaging said fluid pressure actuated cylinder to said sprockets for coordinated movement between said first and second end limits of movement; and
    means for moving said frame and tire support relative to each other in a horizontal plane, said moving means operable when said envelope has been expanded by said rotating means.

2. The envelope expander of claim 1, wherein said engaging means comprises a chain fixedly attached to fluid pressure actuated cylinder at one end and to said rigid frame at its opposite end;
    said chain biased in said second end limit of movement by a spring fixedly connected between said opposite end of said chain and said rigid frame.

3. An envelope expander for mounting an annular envelope of a flexible resilient material on a tire, said envelope having a pair of axially aligned central apertures at opposite sides of said envelope of a diameter approximately equal to the inner diameter of a tire, and said envelope being adapted to enclose the outer surfaces of said tire, said envelope expander comprising:
    a tire support for supporting a tire with a tire axis in a horizontal position;
    a rigid gate-like frame lying in a general vertical plane, pivotable about a generally vertical axis and having an unobstructed opening therethrough generally symmetrical about a central horizontal axis normal to said general plane and of a size sufficient to accommodate the free passage of said tire therethrough with the axis of the tire generally coaxial to said central axis;
    at least one fluid pressure actuated cylinder mounted on said rigid frame having a reciprocal piston rod projecting from said cylinder for coordinated movement between first and second end limits of movement;
    a plurality of envelope engaging members pivotally connected to said rigid frame at respective locations spaced around the periphery of said central axis, said plurality of envelope engaging members movable between respective extended radial inner end limits of movement at a distance from said central axis approximately equal to the inner radius of said tire and respective retracted radial outer end limits of movement at a distance from said central axis greater than the outer radius of said tire, each of said envelope engaging members further including an elongate hollow tubular member having its longitudinal axis curved at a fixed radius, said tubular member operatively connected to the associated engaging member at a longitudinal midpoint with the curved tubular members disposed in a generally circular array about said central horizontal axis, said envelope engaging members adapted to engage said envelope at circumferentially spaced locations around the periphery of one of said central apertures to expand said one of said central apertures upon movement of said reciprocal piston rod from said respective first end limit to a size accommodating movement of said tire axially through said one of said central apertures when said reciprocal piston rods are at said second end limit;
    means for rotating said envelope engaging members about axes parallel to said central axis, said rotating means operatively connected to said rigid frame and said cylinders for coordinated movement between first and second end limits of movement; and
    means for moving said frame and tire support relative to each other in a horizontal plane, said moving means operable when said envelope has been expanded by said rotating means.

4. The envelope expander of claim 3, wherein said frame and tire support moving means is adapted to permit a tire carried on said support means to move through the expanded one of said central apertures in said envelope, and through said unobstructed opening in said frame, into the interior of said envelope, said moving means further comprising a fixed frame mounting said rigid frame for pivotal movement about a first vertical axis at a location equidistant from the axis of a tire on said tire support and from said central horizontal axis of said unobstructed opening in said rigid frame.

5. The envelope expander of claim 4, further comprising releasable brake means engageable between said rigid frame and said fixed frame operable to prevent pivotal movement of said rigid frame about said vertical axis.

6. The envelope expander of claim 5, wherein said tire support includes conveying means for conveying a tire along a fixed path with the tire axis in the horizontal position and extending generally parallel to said fixed path;

means for locating said rigid frame in said fixed path with said central horizontal axis of said unobstructed opening in said rigid frame in coaxial relationship with said tire axis; and means for defining a clearance opening in said rigid frame accommodating the conveying of a tire by said conveying means through said unobstructed opening in said frame.

7. An envelope expander for mounting an annular envelope of a flexible resilient material on a tire, said envelope having a pair of axially aligned central apertures at opposite sides of said envelope of a diameter approximately equal to the inner diameter of said tire and said envelope being adapted to enclose the outer surfaces of said tire, said envelope expander comprising:

a tire support for supporting a tire at a fixed location with a tire axis in a horizontal position;

a rigid gate-like frame lying in a general vertical plane, pivotable about a generally vertical axis and having an unobstructed opening therethrough generally symmetrical about a central horizontal axis normal to said general plane and of a size sufficient to accommodate the free passage of said tire therethrough with the axis of the tire generally coaxial to said central axis;

a fluid pressure actuated motor;

a plurality of fluid pressure actuated cylinders mounted on said rigid frame, each having a reciprocal piston rod projecting from said cylinder for coordinated movement between first and second end limits of movement, said plurality of cylinders being driven by said fluid pressure actuated motor;

a plurality of envelope engaging members pivotally connected to said rigid frame at respective locations spaced around the periphery of said central axis, said plurality of envelope engaging members movable between respective pivotally radially inner end limits of movement at a distance from said central axis approximately equal to the inner radius of said tire and respective retracted pivotally outer end limit of movement at a distance from said central axis greater than the outer radius of said tire, each of said envelope engaging members including an elongate hollow tubular member having its longitudinal axis curved at a fixed radius, said tubular member operatively connected to the associated envelope engaging member at a longitudinal midpoint with the curved tubular members disposed in a generally circular array about said central horizontal axis;

means for rotating said envelope engaging member about axes parallel to said central axis, said means operatively connected to said rigid frame and said cylinders for coordinated movement between first and second end limits of movement;

said envelope engaging members adapted to engage said envelope at circumferentially spaced locations around the periphery of one of said central apertures to expand said one of said central apertures upon rotation of said envelope engaging members from said first end limit of movement to a size accommodating movement of said tire axially through said one of said central apertures when said reciprocal piston rod is at said second end limit of movement;

a fixed frame pivotally supporting said rigid frame for movement about a fixed vertical axis at a location to one side of said fixed location equidistant from the axis of a tire at said fixed location and said central horizontal axis of said unobstructed opening in said frame, said fixed frame operable when said one of said central apertures in said envelope has been expanded by said envelope engaging members for horizontally moving said frame and tire support relative to each other to move a tire on said support through the expanded one of said central apertures in said envelope and said unobstructed opening in said frame into the interior of said envelope; and releasable brake means engageable between said rigid frame and said fixed frame operable to prevent pivotal movement of said rigid frame about said vertical axis.

8. The envelope expander of claim 7, wherein said rotating means comprises:

a plurality of sprockets fixedly mounted to said envelope engaging members and pivotally mounted to said rigid frame; and means for engaging said fluid pressure actuated cylinder to said sprockets for coordinated movement between said first and second end limits of movement.

9. The envelope expander of claim 8, wherein said engaging means comprises a chain fixedly attached to said fluid pressure actuated cylinder at one end and to said rigid frame at its opposite end;

said chain biased in said second end limit of movement by a spring fixedly connected between said opposite end of said chain and said rigid frame.

* * * * *